April 16, 1946.    A. ZAVARELLA ET AL    2,398,458
IMPACT TESTING DEVICE
Filed Jan. 27, 1945    2 Sheets-Sheet 1
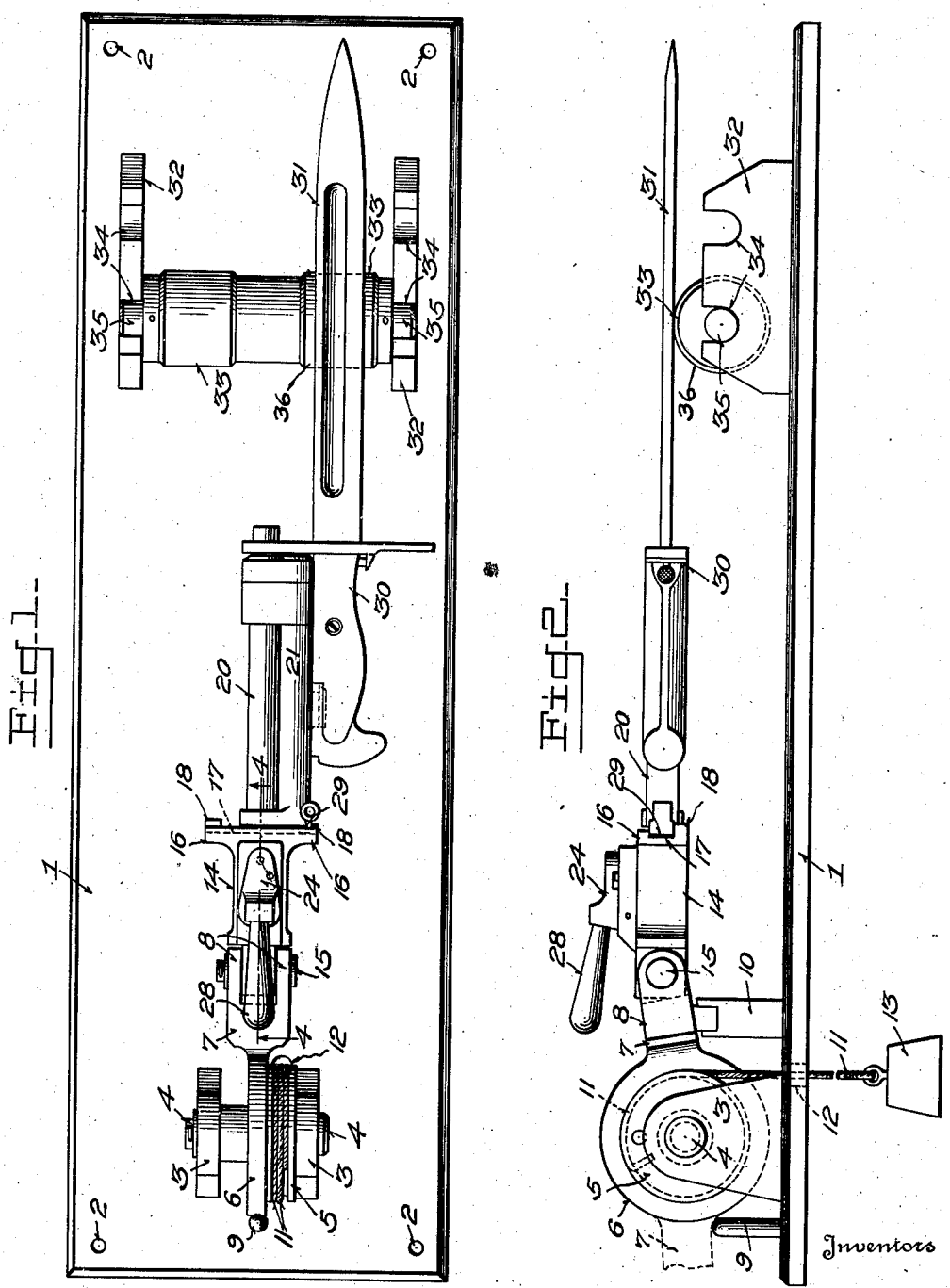
Inventors
LEONARD L. M<sup>c</sup>PHETERS,
ARTHUR ZAVARELLA
By C.E. Herrstrom & W.E. Thibodeau
Attorneys April 16, 1946.　　A. ZAVARELLA ET AL　　2,398,458
IMPACT TESTING DEVICE
Filed Jan. 27, 1945　　2 Sheets-Sheet 2
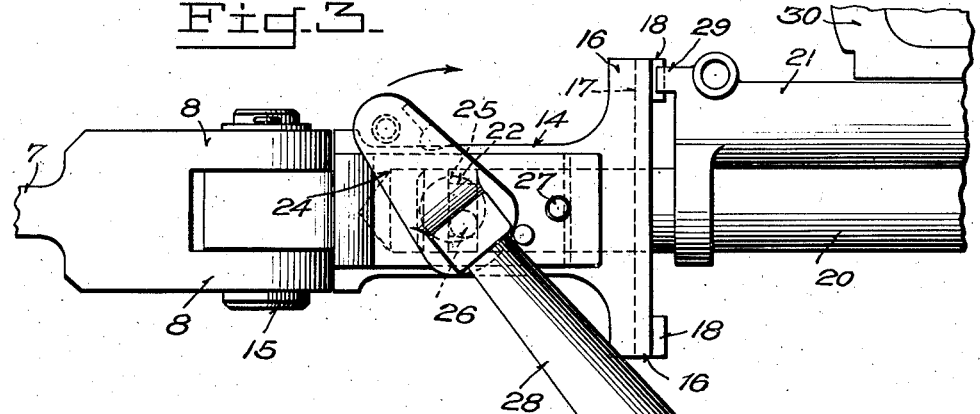
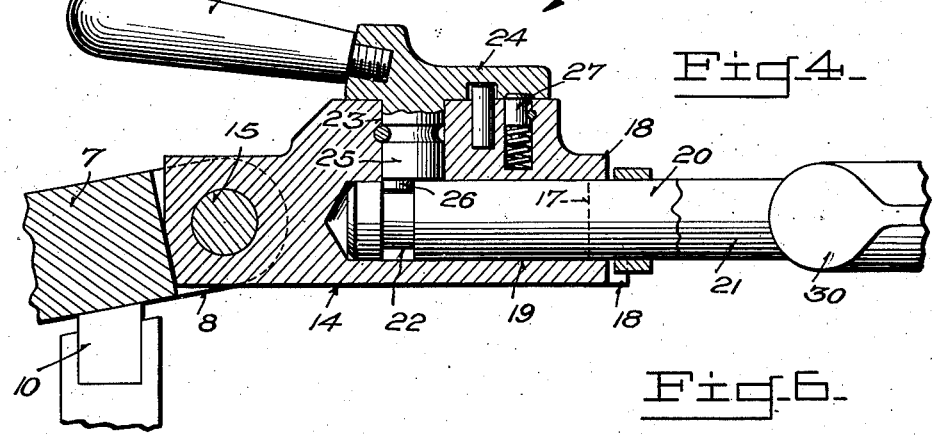
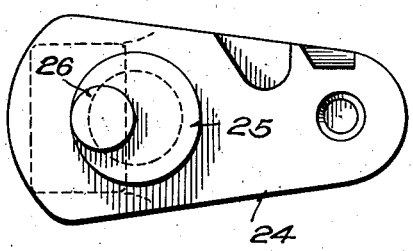
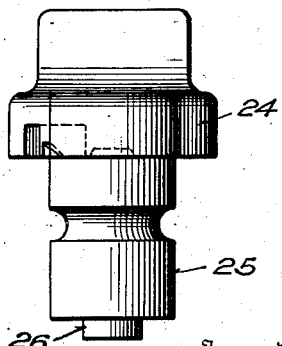
Inventors
LEONARD L. McPHETERS,
ARTHUR ZAVARELLA,
By C. E. Herrstrom & H. E. Thibodeau
Attorneys Patented Apr. 16, 1946

2,398,458

UNITED STATES PATENT OFFICE 2,398,458

IMPACT TESTING DEVICE

Arthur Zavarella, Agawam, and Leonard McPheters, Springfield, Mass., assignors to the Government of the United States of America, as represented by the Secretary of War and his successors in office Application January 27, 1945, Serial No. 574,945

11 Claims. (Cl. 73—12)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to impact testing devices and is directed more particularly to the provision of a novel impact testing device for such ordnance items as bayonet blades or the like.

It is very often desirable to test the impact-resistance of critical components in many articles, especially such components thereof that consist of essentially straight pieces of material, in order to assure that such components will not break or set under the stress or strain of the use for which they are intended. While a multiplicity of tests has been employed for inspecting such parts heretofore, there has not been any standard reproducible impact test as far as ordnance is concerned, so that, as a result thereof, specifications and tests have lacked coordination and it has been practically impossible to obtain reliable results from any duplication of tests made in different places or at different times.

It is accordingly one principal object of this invention to provide a means whereby a reproducible impact test for mechanical parts may be made with the desired end result that standard requirements can be formulated and subsequently written within specifications or contracts. As will appear, the novel apparatus of this invention is particularly adapted to guarantee a dependable and reproducible means of inspection.

A particular object of this invention is to provide a means whereby a reproducible impact test can be made on ordnance matériel such as bayonet blades.

The specific nature of the invention as well as other objects and advantages thereof will clearly appear from a description of a preferred embodiment as shown in the accompanying drawings in which:

Fig. 1 is a top plan view of an apparatus embodying the novel features of the invention.

Fig. 2 is a side elevational view of what is shown in Fig. 1.

Fig. 3 is an enlarged top plan view of what is shown in Fig. 1.

Fig. 4 is a partial view similar to Fig. 2 partly in section.

Fig. 5 is a bottom plan view of the block member.

Fig. 6 is a side elevational view of what is shown in Fig. 5.

Fig. 1 shows an impact testing device embodying the novel features of this invention and it includes a base or plate member 1 which, as shown, may be provided with a plurality of bolt holes 2 for anchoring the said base member to a suitable standard such as a bench or the like. At one end of the base member there is a pair of spaced bearing blocks 3 mounted thereon and which rotatably support a transverse shaft 4 which also carries a drum member 5 and a collar member 6. The latter is formed to have a forwardly extending yoke or a bifurcated member 7 which in the usual case will have arms 8 extending at right angles to the axis of shaft 4. The drum member 5 is provided with a cable 11 which has one end secured thereto and which is wound around the drum in a clockwise direction and has its free end portion preferably extending thru a suitable opening 12 in the base member which free end portion carries a weight or other retaining member such as 13.

A stop 9 is provided on plate 1, adjacent the left end as viewed in Fig. 2 in radial alignment with collar 6 and member 7, so that when collar 6 and member 7 are rotated in a counterclockwise direction, the member 7 will be retained by stop 9 in a horizontal position. A second stop 10 is provided on plate 1 in longitudinal alignment with stop 9, but on the right side of shaft 4 so that when parts 6 and 7 are rotated clockwise, member 7 will be retained in a position somewhat above horizontal.

A block 14 is formed at one end to be pivotally secured between arms 8 as by a shaft 15. The other end of block 14 is provided with lateral horizontally-projecting shoulders 16, each shoulder having a recess 17 and lug 18 as shown in Fig. 3.

In the specific application of this invention to the testing of bayonets, a cylindrical hole 19, which extends longitudinally through block 14 and is axially perpendicular to the axis of shaft 15, is provided midway between shoulders 16 so as to slidably receive a facsimile of the forward portion of the barrel 20 of the rifle to which the bayonet is attachable, for example, the U. S. rifle caliber .30 M1. As shown, the barrel 20 has assembled thereto a gas cylinder 21 and an annular groove 22 adjacent its rear end.

In the top of block 14 is provided a circular opening 23 in axial alignment with hole 19. A block 24, provided with a downwardly depending cylindrical stud 25 and an eccentric cam 26, is assembled on block 14 with stud 25 in hole 23 while eccentric cam 26 engages annular groove 22 in barrel 20. A spring-operated plunger 27 is provided in block 24 to retain the latter in a longitudinal position but movably turnable therefrom, as by means of a handle 28, which is provided therefor.

Barrel 20 is of such length that when assembled in the retracted position, lug 29 on gas cylinder 21 is engaged by lug 18 and recess 17 of block 14, on whichever side said gas cylinder may be positioned. When handle 28 is turned, eccentric cam 26 which engages annular groove 22 will cause said barrel 20 to move outwardly, and disengage lugs 29 on gas cylinder 21 from recess 17 in block 14, thereby permitting barrel 20 and gas cylinder 21 to be rotated up and over a half turn to the other side. Thereupon lug 29 on gas cylinder 21 engages lug 18 and is retracted into recess 17 in block 14 when handle 28 is returned to a longitudinal position, thereby retracting barrel 20 and gas cylinder 21.

By this means, a bayonet 30, assembled in the usual manner to barrel 20 and gas cylinder 21, may be secured first with the blade 31 flat on one side and then, by turning handle 28 to a crosswise position and disengaging lug 29 on gas cylinder 21, said bayonet may be turned and lug 29 re-engaged on the other side in which position the blade 31 will be secured flat on the other side.

An anvil assembly, consisting of two bearing blocks 32 and a cylindrical anvil 33 is mounted toward the right end of plate 1 with anvil 33 horizontal and perpendicular to the longitudinal axis of the testing device. Bearing blocks 32 are mounted adjacent either side of plate 1 parallel to said axis of the testing device and with a multiple of bearing notches 34 in transverse alignment.

The anvil member 33 is provided with bearings 35 to fit in said bearing notches 34 and with a cylindrical portion 36. This cylindrical portion is of such a length that it extends to either side beyond the edges of bayonet blade 31 in both the forward and rearward positions thereof. The upper edge of the anvil 33 is also at such a height as to support the bayonet blade in a horizontal position when member 7 is resting on stop 10.

To operate the impact-testing device, a bayonet is assembled to the barrel and gas cylinder assembly in the usual manner, said assembly being locked on either side and the entire assembly, pivoted on shaft 4, is swung up and over until member 7 contacts stop 9, cable 11 on driving member 5 meanwhile raising weight 13 and the combination thereby forming an energy-storing device. The assembly is then released so that the weight 13 pulls cable 11 down, causing parts 5, 6, and 7 to rotate in a clockwise direction around shaft 4 until member 7 contacts stop 10.

Then the rest of the assembly, consisting of barrel 20, gas cylinder 21 and bayonet 30 moving as a unit, continues to swing downward around shaft 15 until blade 31 impacts on anvil 33. Handle 28 is then swung crosswise, disengaging lug 29 so that the bayonet and gas cylinder assembly can be manually turned to the other side; when handle 28 is swung back to a longitudinal, locking position, the testing cycle is repeated so that impact testing of the bayonet blade on both sides is thereby accomplished.

By varying the mass of weight 13 the force of the impact can be varied at will and made to conform to any prescribed requirement. Also, by placing anvil 33 in any particular pair of bearing notches, the point of impact by said bayonet blade can be varied to accord with any prescribed requirements.

It is therefore obvious that this invention provides a convenient and accurate apparatus whereby a reproducible impact test can be made on critical components, thereby making possible the formulation of a standard requirement that can be written into a specification or contract and for which said test will constitute a reproducible and dependable means of inspection.

We claim:

1. A device for testing the impact resistance in beam loading of an elongated test piece comprising in combination, a base member provided with an anvil member and supporting a rotatable driving member, a pivoted element on the driving member remote from the anvil member, means for securing the test piece on said element so that a portion of the test piece may be brought into engagement with said anvil member as said driving member is rotated, stop means between the pivoted element and the driving member, and means for rotating said driving member to cause the test piece to strike against said anvil member at a predetermined velocity by its own inertia after arrest of the driving member by the stop means.

2. The combination defined in claim 1 wherein said driving member includes a drum member and the last mentioned means includes a cable wound around said drum member and a weight supported by said cable.

3. A device for testing the impact-resistance of a test-piece comprising, a base member provided with an anvil and supporting a rotatable driving member remote from the anvil, means pivoted to the driving member for securing the test-piece to said driving member in such relationship thereto as to bring a portion of the test-piece into engagement with said anvil as said driving member is rotated, stop means for the driving member and an energy-storing device associated with said driving member and arranged to oppose manual rotation of the latter and of the test-piece in a direction away from said anvil, whereby the arcuate extent of free rotation of the driving member determines the velocity of impact of the test-piece against the anvil, and impact of the test piece is occasioned by inertia after arrest of the driving member by the stop means.

4. A device for testing the impact-resistance of a test-piece comprising in combination, a base member provided with an anvil and supporting a rotatable driving member, means for pivotally securing the test-piece to said driving member for limited movement in the plane of rotation of said driving member and arranged to bring a portion of the test-piece into engagement with said anvil as said driving member is rotated, a stop for said driving member provided at a point prior to the contact of the test-piece with the anvil whereby pivotal movement of the test-piece will bring the latter into contact with said anvil, and an energy-storing device associated with said driving member arranged to oppose manual rotation of the latter and of the test-piece in a direction away from said anvil whereby the arcuate extent of free rotation of the driving member determines the velocity of impact of the test-piece against the anvil.

5. A device for testing the impact-resistance in bending of an elongated test-piece comprising in combination, a base member provided with an anvil and supporting a rotatable driving member, linkage means whereby the test-piece is pivotally secured to the driving member at a point remote from the anvil and is adapted to be rotated by said driving member so as to contact with said anvil, and stop means between the linkage means and driving member whereby impact of the test piece on the anvil is occasioned by inertia of the test piece and linkage means.

6. A device for testing the impact-resistance of a test-piece comprising in combination, a base member provided with an anvil and supporting a rotatable driving member, linkage means whereby the test-piece is pivotally secured to the driving member and is adapted to be rotated by said driving member so as to contact with said anvil, and a stop for the rotation of said driving member at the point prior to the contact of the test-piece with said anvil whereby pivotal movement of the test-piece relative to the driving member will bring the test-piece into contact with the anvil.

7. A device for testing the impact-resistance of a test-piece comprising in combination, a base member provided with an anvil, a rotatable driving member supported by said base member, linkage means whereby the test-piece is pivotally secured to the driving member and adapted to be rotated thereby in such a way as to contact said anvil, stop means for said driving member at the point prior to the contact of the test-piece with said anvil, and selective means for positioning said anvil on the base member in any one of a plurality of positions relative to the axis of rotation of said driving member.

8. A device for testing the impact-resistance of a test-piece comprising in combination, a base member provided with an anvil and supporting a rotatable driving member, means for securing a test-piece to said driving member so that a portion of said test-piece may be brought into engagement with said anvil as said driving member is rotated, means for rotating said driving member to cause the test-piece to strike against said anvil at a predetermined velocity, and means for selectively positioning said anvil on the base member in any one of a plurality of positions of successively greater displacement from the axis of rotation of said driving member.

9. A testing device for testing the impact-resistance of a test-piece comprising, a base member supporting a rotatable drum, means for rotating said drum under substantially constant accelerative stress, an arm provided on said drum, an extension member pivotally secured to said arm and lying in a plane perpendicular to the axis of rotation of said arm, means whereby the test-piece can be rigidly secured to said extension member in a plurality of positions, an anvil adjustably positioned on said base member so as to be impacted by the test-piece as said drum rotates, a first stop arranged to limit the rotation of said drum in a direction away from said anvil, and a second stop arranged to stop the rotation of said drum just prior to contact of the test-piece with said anvil.

10. A device for testing the impact-resistance of a longitudinal test-piece comprising in combination, a base member provided with an anvil member and supporting a rotatable driving member, means for securing one end of the test-piece to said driving member so that a portion of the test-piece may be brought into engagement with said anvil member as said driving member is rotated, said last mentioned means including means for selectively positioning the test-piece on said driving member so that either side of the test-piece will contact said anvil member, and means for rotating said driving member to cause the test-piece to strike against said anvil member at a predetermined velocity.

11. A device for testing the impact-resistance of a longitudinal test-piece comprising, a base member supporting a rotatable drum, means for rotating said drum under substantially constant accelerative stress, an arm provided on said drum, an extension member pivotally secured to said arm and lying in a plane perpendicular to the axis of rotation of said arm, means for rigidly securing one end of the test-piece to said extension member, said last mentioned means including means for selectively positioning the test-piece on said extension member in either of two 180° displaced positions relative to its longitudinal axis, an anvil adjustably positioned on said base member so as to be impacted by the test-piece as said drum rotates, a first stop arranged to limit the rotation of said drum in a direction away from said anvil, and a second stop arranged to stop the rotation of said drum just prior to contact of the test-piece with said anvil.

ARTHUR ZAVARELLA.
LEONARD McPHETERS.